United States Patent [19]

Dischler

[11] Patent Number: 5,160,006
[45] Date of Patent: * Nov. 3, 1992

[54] OVERLOAD CLUTCH WITH AUTOMATIC DISENGAGEMENT

[76] Inventor: Helmut Dischler, Droste-Hülshoff-Str. 9, 4040 Neuss, Fed. Rep. of Germany

[*] Notice: The portion of the term of this patent subsequent to Oct. 16, 2005 has been disclaimed.

[21] Appl. No.: 729,937

[22] Filed: Jul. 15, 1991

Related U.S. Application Data

[63] Continuation of Ser. No. 8,298, Jan. 29, 1987, Pat. No. 5,031,742.

[30] Foreign Application Priority Data

Feb. 6, 1986 [DE] Fed. Rep. of Germany ....... 3603672

[51] Int. Cl.$^5$ .............................................. F16D 43/20
[52] U.S. Cl. .................... 192/56 R; 192/48.3
[58] Field of Search ................ 192/48.3, 48.5, 48.7, 192/56 R

[56] References Cited

U.S. PATENT DOCUMENTS

| | | | |
|---|---|---|---|
| 2,401,992 | 6/1946 | Waller | 192/56 R |
| 2,633,215 | 3/1953 | Battaline | 192/56 R |
| 2,637,987 | 5/1953 | Hill et al. | 464/37 |
| 2,773,370 | 12/1956 | Intraub et al. | 464/37 |
| 3,252,553 | 5/1966 | Peterson et al. | 192/48.4 |
| 4,265,347 | 5/1981 | Dischler | 192/56 R |

FOREIGN PATENT DOCUMENTS

| | | |
|---|---|---|
| 2759136 | 7/1979 | Fed. Rep. of Germany . |
| 3235544 | 3/1984 | Fed. Rep. of Germany . |
| 3445577 | 6/1986 | Fed. Rep. of Germany . |
| 85/02661 | 6/1985 | PCT Int'l Appl. . |
| 2086791 | 5/1982 | United Kingdom . |

Primary Examiner—Richard Lorence
Attorney, Agent, or Firm—Marmorek Guttman & Rubenstein

[57] ABSTRACT

The present invention provides an adjustable and automatically disengaging overload clutch for driving a tool, comprising a first clutch half frictionally engaged with a second clutch half and a coupler bracket for transmitting torque from the second clutch half to the tool. The clutch further comprises a spring connecting the second clutch half to the coupler bracket to transmit torque from the second clutch half to the coupler bracket. The spring is designed so that if a predetermined torque is exceeded, the second clutch half is released from the coupler bracket, thus preventing the transmission of any further torque. Levers associated with the coupler bracket and the second clutch half are also provided for disengaging the second clutch half from the first clutch half.

7 Claims, 2 Drawing Sheets

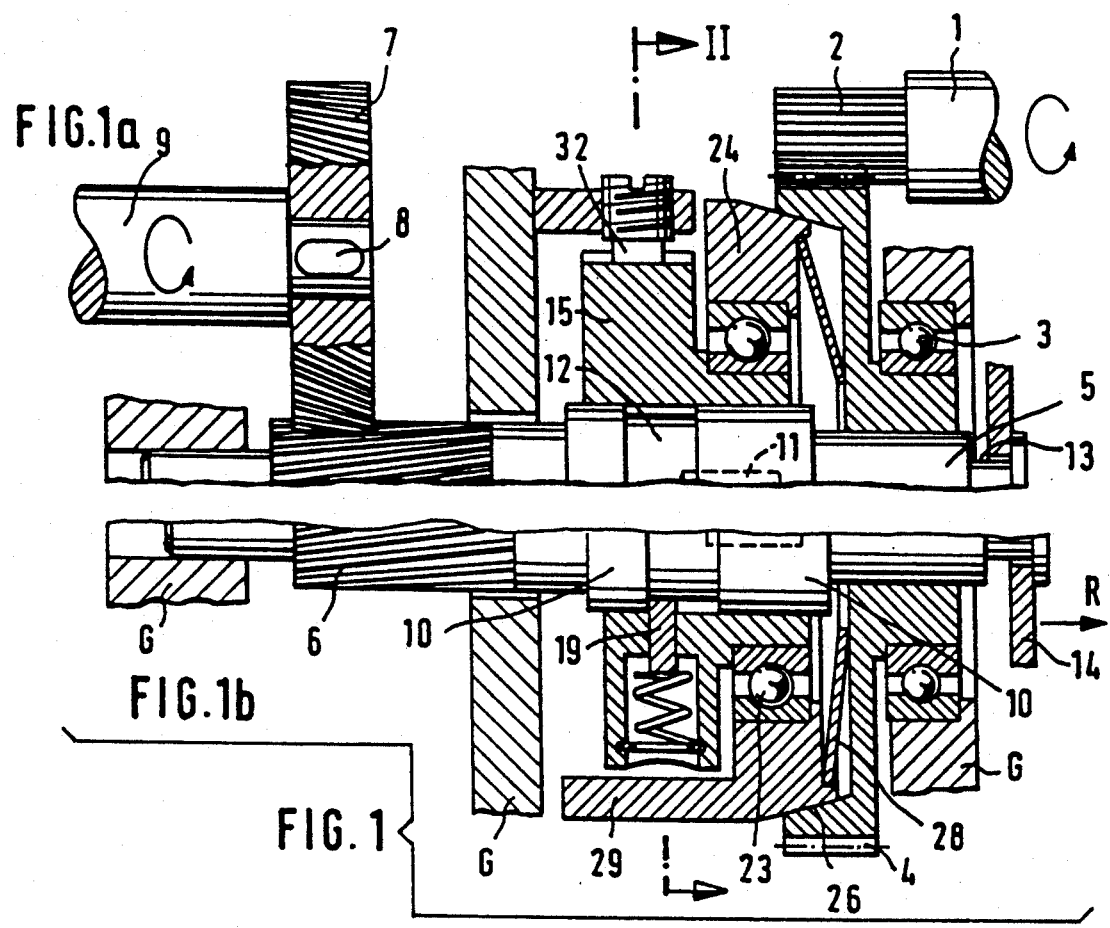
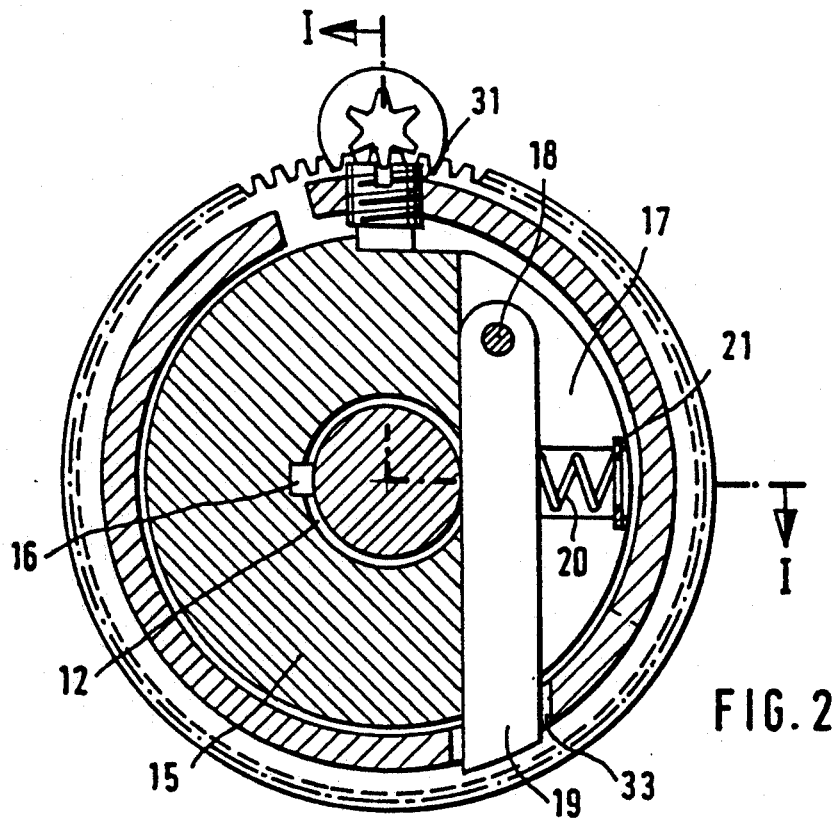

OVERLOAD CLUTCH WITH AUTOMATIC DISENGAGEMENT

This is a continuation of application Ser. No. 008,298, filed Jan. 29, 1987, now U.S. Pat. No. 5,031,742.

BACKGROUND OF THE INVENTION

The instant invention relates to an adjustable overload clutch with automatic disengagement when a predetermined torque is exceeded. Such a clutch is especially suited for use with power-driven hand tools for pressing, cutting, etc.

A clutch in the form of a friction clutch having two clutch halves is known from DE-PS 27 09 946. In this prior art clutch, one of the clutch halves can be displaced in relation to the other half against a spring force and can be coupled to the other half. The clutch is provided with a limit load safety mechanism which makes an axial displacement of the clutch halves in relation to each other possible when activated upon reaching the limit load.

Clutches of the above-mentioned type are subjected to influences originating in the power drive, and also originating in the driven tools. These influences can negatively affect the precision with which the clutch is disengaged. These negative influences include brief torque variations acting upon the clutch from the drive side and especially from the driven side, as well as axial forces acting upon the clutch. These influences which could also be called vibrations have as a consequence that the disengagement of the clutches can occur within an undesirably wide range of errors. This leads on the one hand to an overly frequent disengagement of the clutch and therefore to its excessive wear, and on the other hand to a greater time consumption in the operation of the tool.

It is the objective of the instant invention to provide a clutch which is of simple design, can be manufactured economically, has a long life and always disengages reliably when the predetermined torque or the predetermined limit load is reached.

SUMMARY OF THE INVENTION

This objective and other objectives are achieved by means of the present invention which provides an adjustable and automatically disengaging overload clutch for driving a tool, comprising a first clutch half frictionally engaged with a second clutch half, and a coupler bracket for transmitting torque from the second clutch half to the tool. The clutch further comprises a spring connecting the second clutch half to the coupler bracket to transmit torque from the second clutch half to the coupler bracket. The spring is designed so that if a predetermined torque is exceeded, the second clutch half is released from the coupler bracket, thus preventing the transmission of any further torque. Levers associated with the coupler bracket and the second clutch half are also provided for disengaging the second clutch half from the first clutch half.

According to the invention, forces exerted axially upon the clutch such as arise with most tools connected to the clutch, whether the tools are drills, cutting tools or pressing tools, remain without influence upon the moment of disengagement of the clutch. The disengagement of the clutch which depends on the torque or on the limit load occurs when a precisely defined value is reached. It does not occur for such reasons as for example the accumulated effect of prior peaks of these values which did not reach the limit value.

In a preferred embodiment of the clutch according to the invention, the springs which are provided are in the form of bending leaf springs which can alter their shape elastically and radially in the direction of the clutch axis. Disengagement of the clutch can be achieved in this way with especially great precision.

The springs can also comprise hollow cylinder segments and can be unitary with the coupling half. In this design not only disengagement is achieved with great precision, but the design of the clutch is especially simple.

In addition to being capable of altering their form elastically and radially towards the axis of the clutch, the springs can also be workable in the axial direction of the clutch, and in this case the mechanism for the disengagement of the clutch can be simplified.

In a preferred embodiment of the clutch according to invention, a ball bearing, in particular a low-friction ball bearing, is installed between clutch half and a coupler bracket. This facilitates the limited swiveling of the clutch half in relation to the coupler bracket.

It is furthermore advantageous for an abutment extending in the axial direction to be provided at the spring, the abutment bearing upon the circumference of the coupler bracket in conjunction with one or several recesses. This configuration has as a consequence that the clutch, independently of the preceding axial shocks and independently of the preceding short-falls of torque or limit value which almost reach the predetermined limit, only disengages when these limit values have actually been exceeded, without a prior addition of these values being taken into consideration.

In a preferred embodiment, catches are provided at the coupler bracket, which catches are pivotably attached levers interacting with a recess in the shaft bearing the coupler bracket and the free ends of which extend into bores in the circumference of the clutch half. This design results in the release of the clutch under the above-described conditions, but only under these conditions.

The clutch according to the invention has in particular the advantage that the overload part of the clutch is separated from its disengagement part. The overload part operates to a great degree independently from the disengagement part and only causes the disengagement to occur when all the criteria requiring the disengagement of the coupling have actually been reached, but not before, as a consequence of separate influences.

BRIEF DESCRIPTION OF THE DRAWINGS

Examples of the embodiments of a clutch according to invention are shown in the drawings in which FIG. 1 is a longitudinal section through the clutch, in readiness position before engagement of the clutch at the top (FIG. 1A) and in the engaged state in the lower portion of the view (FIG. 1B).

FIG. 2 is a section along line II—II of FIG. 1, in readiness position as well as in engaged state.

DETAILED DESCRIPTION OF PREFERRED EMBODIMENTS

Figure 3:
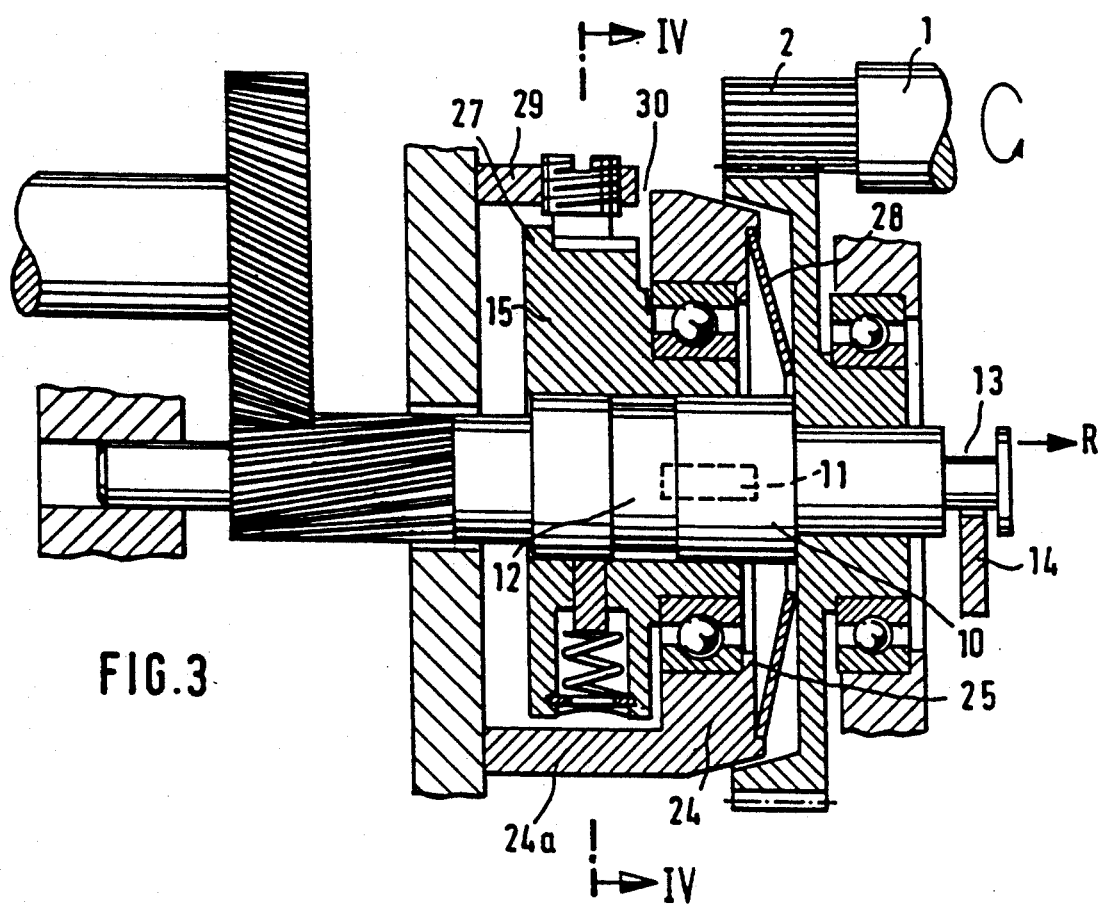
FIG. 3 is a longitudinal section of the clutch in disengaged state. The upper part of FIG. 3 is different from the above mentioned Figures.

The clutch shown in the drawings is built into a tool the housing of which is shown incompletely on the left side of FIGS. 1 and 3. The parts used for the support of the clutch are designated with the letter G in FIG. 1. A drive motor (also not shown) on the right side of FIGS. 1 and 3 drives a first clutch half 4 provided with outer teeth via drive shaft I (an input member) and pinion gear 2. The clutch half 4 is supported on ball bearings 3 in a housing G. In the clutch half 4, one end of a transmission shaft 5 is supported on bearings, the other end of transmission shaft 5 being supported on bearings in housing G. The transmission shaft 5 is provided at the end extending into housing G with helical gearing 6 engaging a drive gear 7 which drives drive shaft 9 (an output member) via a key 8. In a variation of the embodiment of the example, it is also possible for the transmission shaft 5 itself to serve as a drive shaft for a tool, whereby the teeth of helical gearing 6 then serve as coupling elements for the continued drive.

Approximately in the middle of the transmission shaft 5 is a collar 10 having a narrowed portion 12 surrounded by a recess or a groove. The transmission shaft 5 is rigidly connected to the coupler bracket 15 via key 11, this connection allowing however for a limited axial shift between the transmission shaft 5 and the coupler bracket 15. For the operation and activation of the clutch, the transmission shaft 5 can be moved forward from the outside of the housing by elements 14 which are connected to appropriate rods. For example, the transmission shaft 5 can be moved by hand via elements 14 in direction R to effect coupling. On the collar 10 of transmission shaft 5, the coupler bracket 15 is secured against twisting by key 11 engaging a groove 16, but couple bracket 15 is capable of longitudinal displacement along the collar 10.

Figure 4:
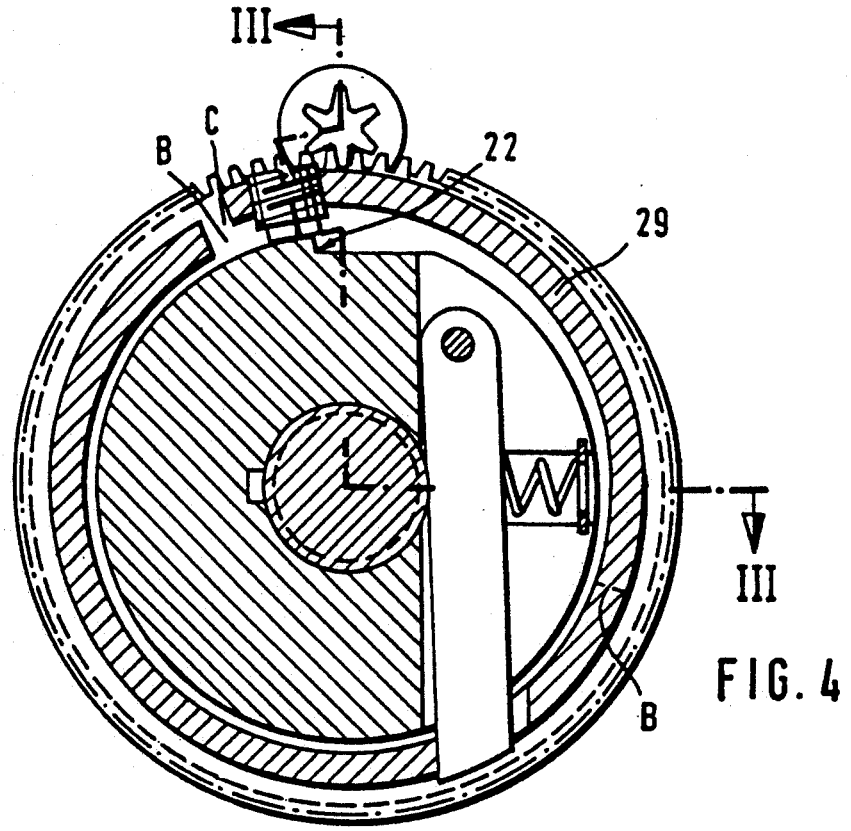
FIG. 4 is a section along line IV—IV of FIG. 3.

A lever 19 comprises a movable lock and is supported on a bolt 18 in a notch 17 of coupler bracket 15 (FIG. 2). Lever 19 is pushed by spring 20 in radial direction into the recess surrounding portion 12 of the transmission shaft 5. Spring 20 is held by a spring ring 21. Furthermore, coupler bracket 15 is provided with a recess 22 (FIG. 4) which receives the force from the torque before disengagement.

Above the ball bearing 23 which is fixedly seated on the coupler bracket 15 on one side, the second clutch half 24 is supported and is held by its collar 25 (FIG. 3) against axial shifting on the ball bearing. In the illustrated embodiment, the clutch is a conical clutch with a cone 26, clutch part 24 being an outer cone and clutch part 4 being an inner cone. In variance of the cone clutch which is preferred because of its simplicity and practicality, other shapes of a switchable clutch can be used.

Instead of the low-friction ball bearing 23, it is also possible to use an elastic link (not shown in the drawing) for the transmission of the axial forces, for example a rubber ring which is mostly friction free in its operation. These bearings are not needed if the spring 29 is made so as to be capable of accepting axial forces in an elastic manner and if it is also of appropriate size. In that case the axial forces can be transmitted via a collar 27 (FIG. 3) on the coupler bracket 15 and the ball bearing 23 or instead, the elastic link can be dispensed with. In that case it is however suggested that instead of one spring 29, at least two such springs be provided in order to avoid one-sided force effects.

The clutch is kept in opened position by means of a Belleville spring washer 28.

A spring, i.e., an elastic link, is attached to the clutch half 24. This spring is a bending leaf spring 29 in the embodiment of the example. This spring is formed as an extension of the clutch half 24 (FIG. 3) that is separated laterally from ring 24a by an incision 30 going up to BB (FIG. 4) and a longitudinal incision at point C to form the annular leaf spring 29. At one of the ends of spring 29 a threaded bore is provided, which accepts a setting screw 31. At the lower end of the screw 31, flattened surfaces 32 can be supported on recess 22 to transmit the torque. The leaf spring 29, the setting screw 31 with its flattened surfaces 32, and the recess 22 comprise a catch mechanism for the coupler bracket 15 and the clutch half 24. When the screw 31 is properly set, the spring 29 can be pretensed radially. Ring 24a is provided with a bore 33 into which lever 19 engages with a certain amount of clearance.

The operation of the clutch is described hereinafter.

With the clutch open, the clutch half 4 is first rotated by a motor (not shown) via motor shaft 1 and pinion gear 2. Since the spring 28 holds the cone clutch open, the transmission shaft 5 with all its connected parts, does not rotate along with it. However, when the element 14 is displaced axially in the direction of arrow R, for example by a connected hand lever in the recess portion 13, the coupler bracket 15, and with it the clutch half 24, is brought into engagement with clutch half 4 via bearing 23, as the lever 19 is applied against the recess portion 12 of collar 10. The rotation of the clutch half 4 is now transmitted to the transmission shaft 5 by key 11, and the driving toothed gear 7 engaging helical gearing 6 drives the drive shaft 9 via key 8, and said drive shaft 9 in turn drives, as needed, a spindle for example to produce an axial movement, or a screw driver to screw in screws, or some other tool.

When the clutch is to be disengaged automatically, because the predetermined torque or limit force has been reached, the annular spring 29 is further bent upwards due to the tangential circumferential force applied to the flattened screw area 32 when bearing against the recess 22, and this has as a consequence that the flattened area 32 is lifted until it rises over the edge of recess 22 and jumps or slips over the recess. To ensure that the torque does not exert any interfering forces as it is transmitted from the friction or cone surface 26 via clutch half 24 and the connected ring 24a which continues into spring 29, in spite of the axial forces through the helical gearing 6 or through the manual force exerted in direction R, the low-friction ball bearing or rubber or sliding bearing is provided to absorb axial or other interfering forces; however, the ball bearing 23 is preferred in this instance.

In order to obtain a precise response of the clutch it is furthermore necessary to dampen irregularities of form which occur in operation, and which could be provoked at the drive or by the gear wheels themselves, whether they are axial moments or changes in torque. To compensate for these irregularities, damping links or other elastic parts can be used and installed especially in the drive or disengagement zone, but this is very costly. In the clutch according to the instant invention this damping effect is obtained by means of spring 29 and the clutch half 24 is in fact only released when a certain torque or a certain limit force is exceeded. An addition of previous influences, causing the clutch to be disengaged too soon, does not occur.

This is due in particular to the fact that once the torque has been switched off as surface 32 jumps over the recess 22, said torque collapses to a low friction value caused by the friction of screw 31 on the outer circumference of the coupler bracket 15. The clutch with conical friction surfaces 26 however remains engaged. Only when the screw surface 32 has moved for a short distance on the outer circumference of the coupler bracket 15 and has rotated with respect to same, whereby bore 33, connected to clutch half 24, has been turned in relation to the coupler bracket 15, whereby it also moves lever 19, is lever 19 taken along by this bore. This slaving has as a consequence that lever 19 is swivelled away from recess portion 12 of the transmission shaft 5 by swiveling around bolt 18, and continues until this occurrence.

When this has occurred, no axial force can be transmitted by the transmission shaft 5 via coupler bracket 15, ball bearing 23 and the second clutch half 24 to the cone or friction surfaces 26. The clutch is then disengaged (FIG. 3).

In order to prevent the transmission shaft 5 from shifting too far in direction R, collar 10 is stopped by the clutch half 4.

Since no torque and no axial forces via helical gearing 6 is any longer present in the transmission shaft 5 at that moment, the transmission shaft 5 can be pushed forward in the opposite direction of arrow R by a small force exerted upon element 14 until lever 19 catches once more in the recess 12 of the transmission shaft 5 under the influence of the force of spring 20. Similarly, screw 31 catches once more with its flattened surfaces 32 in recess 22. The predetermined moment of disengagement can be set by turning the adjustment screw 31. Furthermore, a restoring spring, influencing the effect of spring 29, can be installed in the area of screw 31.

As a variant of the embodiment given as an example, the clutch can also be made in form of a turning clutch, according to the invention. Only an additional friction disk, or even a Belleville spring washer need be installed for this, the configuration of which could essentially be adapted to the clutch half 4 and which can be pressed against clutch half 24.

When the clutch according to the invention is used between the drive motor and the tool side, the drive motor can be running continuously without being switched off before or between the different operating steps on the tool side. The sequence of operating steps can be accelerated in this manner and the wear on the drive motor can be decreased.

While the invention has been described by reference to specific embodiments, this was for purposes of illustration only and should not be construed to limit the spirit or the scope of the invention.

I claim:

1. An overload clutch which automatically disengages when a limit load is reached, comprising
   a) first (24) and second clutch halves (4), said first and second clutch halves (24,4) being fictionally engageable with each other,
   b) one of said clutch halves (24) being mounted in said clutch so as to be displaceable against a spring force (28) relative to said other clutch half (4),
   c) said one of said clutch halves (24) being pivoted on a coupling bracket (15),
   d) said coupling bracket (15) being non-rotatably mounted on a coupling shaft (5),
   e) said coupling bracket (15) and said clutch half (24) pivoted thereon being connected to each other via a catch mechanism (29, 31, 32, 22) for the transmission of torque between said coupling bracket (15) and said clutch half (24) pivoted thereon,
   f) said catch mechanism (29, 31, 32, 22) being mounted so that it is relieved of axial forces to be transmitted between said coupling bracket (15) and said clutch half (24) pivoted thereon,
   g) said catch mechanism (29, 31, 32, 22) being set so that when a predetermined load is reached, the connection between said coupling bracket (15) and said clutch half (24) pivoted thereon is released and said coupling bracket (15) and said clutch half (24) pivoted thereon can rotate to a limited extend relative to each other, and
   h) at least one movable lock (19) preventing axial displacement of said clutch half (24) pivoted on said coupling bracket (15),
   said lock (19) being mounted so that it moves out of a locking position as a result of the relative rotational movement of said coupling bracket (15) and said clutch half (24) pivoted thereon when said catch mechanism (29, 31, 32, 22) releases, thus permitting relative axial movement of said first and second clutch halves (24, 4) in a direction which disengages them.

2. The clutch of claim 1 wherein said catch mechanism comprises a bending leaf spring, said bending leaf spring being deformable in a radial direction.

3. The clutch of claim 2 wherein said bending leaf spring comprises a hollow cylinder segment.

4. The clutch of claim 3 wherein said bending leaf spring is integral with said clutch half pivoted on said coupling bracket.

5. The clutch of claim 4 further comprising ball bearing means disposed between said coupling bracket and said clutch half pivoted thereon.

6. The clutch of claim 5 wherein said lock comprises a lever received in a recess of said coupling bracket.

7. The clutch of claim 1 further comprising a transmission shaft having a narrow portion, said lock comprising a lever pivotably mounted on said coupling bracket and interacting with said narrow portion of said transmission shaft, said lever including a free end being received in a bore on the circumference of said clutch half pivoted on said coupling bracket.

* * * * *